(12) United States Patent
Snyder et al.

(10) Patent No.: US 7,743,267 B2
(45) Date of Patent: Jun. 22, 2010

(54) SYSTEM AND METHOD FOR REDUCING POWER CONSUMPTION IN A DEVICE

(75) Inventors: Trevor James Snyder, Newberg, OR (US); Amy Rachel Bartlett, Portland, OR (US); Jennifer M. Miyamoto, Portland, OR (US); David Russel Sponable, Salem, OR (US); Jasper Kent Wong, Portland, OR (US); Marcia Dawn Haney, Oregon City, OR (US); David Paul Platt, Newberg, OR (US); Debra Ranee Koehler, Sherwood, OR (US); Timothy Rob Golik, Portland, OR (US); Mark Harris Tennant, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 780 days.

(21) Appl. No.: 11/594,397

(22) Filed: Nov. 8, 2006

(65) Prior Publication Data

US 2008/0109663 A1    May 8, 2008

(51) Int. Cl.
G06F 1/00    (2006.01)
G06F 1/26    (2006.01)
G06F 1/32    (2006.01)

(52) U.S. Cl. .................. 713/320; 713/300; 713/324
(58) Field of Classification Search .................. 713/300, 713/320, 324
See application file for complete search history.

(56) References Cited

U.S. PATENT DOCUMENTS

| 5,566,340 | A  | * | 10/1996 | Stewart et al. .............. 713/323 |
|---|---|---|---|---|
| 5,617,572 | A  | * | 4/1997  | Pearce et al. ............... 713/323 |
| 5,636,332 | A  | * | 6/1997  | Hibino ...................... 358/1.13 |
| 5,657,257 | A  |   | 8/1997  | Lee |
| 5,821,924 | A  | * | 10/1998 | Kikinis et al. ............... 345/212 |
| 5,900,026 | A  |   | 5/1999  | Ryu |
| 5,974,559 | A  |   | 10/1999 | Bannai |
| 6,011,383 | A  |   | 1/2000  | Dean et al. |
| 6,243,548 | B1 |   | 6/2001  | Hebert et al. |
| 6,260,111 | B1 |   | 7/2001  | Craig et al. |
| 6,317,571 | B1 | * | 11/2001 | Adams ....................... 399/67 |
| 6,347,377 | B2 | * | 2/2002  | Barbee ....................... 713/300 |
| 6,457,134 | B1 | * | 9/2002  | Lemke et al. ............... 713/323 |
| 6,594,767 | B1 |   | 7/2003  | Wiley et al. |
| 6,654,895 | B1 | * | 11/2003 | Henkhaus et al. ........... 713/320 |
| 6,665,803 | B2 | * | 12/2003 | Lunsford et al. ........... 713/320 |
| 6,713,728 | B1 |   | 3/2004  | Justice et al. |
| 6,715,088 | B1 |   | 3/2004  | Togawa |
| 6,724,493 | B1 |   | 4/2004  | Maruta et al. |
| 6,766,223 | B1 |   | 7/2004  | Motoyama |
| 6,885,974 | B2 | * | 4/2005  | Holle ........................ 702/182 |
| 6,912,664 | B2 |   | 6/2005  | Ranganathan et al. |
| 6,928,564 | B2 |   | 8/2005  | Tada et al. |

(Continued)

*Primary Examiner*—Mark Connolly
(74) *Attorney, Agent, or Firm*—Maginot, Moore & Beck LLP (57) ABSTRACT

A system and process enable a device to adjust the duration of various power modes based on usage of the device. The process includes operating a device at a fully operational power level, counting a first wait time, modifying a first wait time modifier in response to detection of image generating device use prior to expiration of the first wait time, and reducing power consumption from the fully operational level to a low power level in response to expiration of the first wait time.

20 Claims, 5 Drawing Sheets

U.S. PATENT DOCUMENTS

| | | |
|---|---|---|
| 7,013,204 B1 | 3/2006 | Motoyama |
| 7,082,373 B2 | 7/2006 | Holle |
| 7,380,147 B1 * | 5/2008 | Sun ............................ 713/323 |
| 7,549,065 B2 * | 6/2009 | Schutte ........................ 713/300 |
| 2001/0047490 A1 | 11/2001 | Barbee |
| 2006/0173582 A1 | 8/2006 | Motoyama |

* cited by examiner

FIG. 4 ced by the timer in response
to the device controller detecting usage of the device, and a
power controller for selectively setting the device at one of a
plurality of power consumption levels in response to the
power level adjustment signal.

SYSTEM AND METHOD FOR REDUCING POWER CONSUMPTION IN A DEVICE

CROSS-REFERENCED APPLICATION

This application cross-references co-pending patent application bearing Ser. No. 11/594,414, which is entitled "Printer Having User Profiles For Conserving Power Consumption" and was filed on even date herewith. This application is owned by the assignee of the present application and is incorporated by reference in its entirety.

TECHNICAL FIELD

This disclosure relates generally to electrically powered devices and, more particularly, to electrically powered devices that operate at multiple levels of power consumption.

BACKGROUND

Many imaging devices, such as printers, scanners, and copiers, operate at different power consumption levels. When the devices are not generating images or have not been used for some specified period of time, they typically operate in a power saving mode. These modes are sometimes known as standby modes, low power modes, or sleep modes. In the power saving mode, the devices draw enough power to support low voltage electronics that are awaiting actuation for operation of the device for printing, scanning, or copying. In response to a user touching or depressing a device actuator or in response to receipt of a print job, the device controller activates components that draw additional power in preparation for use of the device. For example, a scanner may warm up a scanning lamp and a printer or copier may warm a fuser roll. Once the device has been used, it may remain at the higher power consumption level for some predetermined monitoring period of time to maintain one or more components within an operational temperature range. The device remains at the operational level of power consumption in anticipation of imminent subsequent usage. This action reduces the number of cycles experienced by the components, which helps preserve their operational life, and also reduces or eliminates wait time for the customer. Upon expiration of the monitoring period without further use, the device returns to the power saving mode.

Solid ink printers and laser printers, in particular, have some power intensive functions to perform in preparation for being ready to print. For example, in a laser printer, the fuser typically operates at 150 to 200° C. In the case of a solid ink printer, the print head typically operates at about 130 to 140° C. and the imaging drum operates at about 60 to 65° C. A solid ink printer in standby mode typically reduces the print head and image drum temperatures in order to conserve energy. The print head temperature is held at a temperature slightly above the solidifying temperature for the melted ink. While this mode of operation reduces the electrical power consumption of the solid ink printer, it does not necessarily reduce power consumption that is comparable with printing technologies that do not require heating of the ink to maintain it in a liquid state. Also, in order to avoid the time waiting for the print head or imaging drum to achieve operating temperature, the optimal point from a customer usage standpoint may be at higher power consumption levels. Therefore, improvements in printer hardware and software are desirable to reduce power consumptions levels in printers that meet current and future government energy conservation standards while providing prompt response times for customers.

SUMMARY

In order to balance the power usage of a printer With customer usage needs, a new control process has been developed that adjusts the duration of power consumption levels in anticipation of device operation. The process includes operating a device at a fully operational power level, counting a first wait time, modifying a first wait time modifier in response to detection of device use prior to expiration of the first wait time, and reducing power consumption from the fully operational level to a low power level in response to expiration of the first wait time.

A system may be used to implement a power adjustment process. The system includes a timer for generating a power level adjustment signal in response to expiration of a time period being counted by the timer, a device controller for controlling operation of a device, the device controller modifying the time period being counted by the timer in response to the device controller detecting usage of the device, and a power controller for selectively setting the device at one of a plurality of power consumption levels in response to the power level adjustment signal.

The system and process for adjusting the duration of power modes may be used to control power consumption in an ink jet printer. Such an ink jet printer may include an ink reservoir for storing liquid ink, a print head for receiving the liquid ink from the ink reservoir, an imaging member for receiving liquid ink ejected from the print head to form an ink image on the imaging member, a transfer subsystem for fixing the ink image, the transfer subsystem including at least one heated roller, and an electronics module for controlling operation of the ink jetting printer, the electronics module further comprising a timer for counting time periods and generating a power adjustment signal upon expiration of a time period counted by the timer, a printer controller for generating control signals for operation of the printer and for modifying the time periods counted by the timer in accordance with usage of the printer, and a power controller for setting a power consumption level to one of a plurality of power consumption levels for the printer in response to receipt of one of a power adjustment signal and an imaging generating request.

BRIEF DESCRIPTION OF THE DRAWINGS

The foregoing aspects and other features of a printer implementing a power conservation process are explained in the following description, taken in connection with the accompanying drawings, wherein.

DETAILED DESCRIPTION

Figure 1:
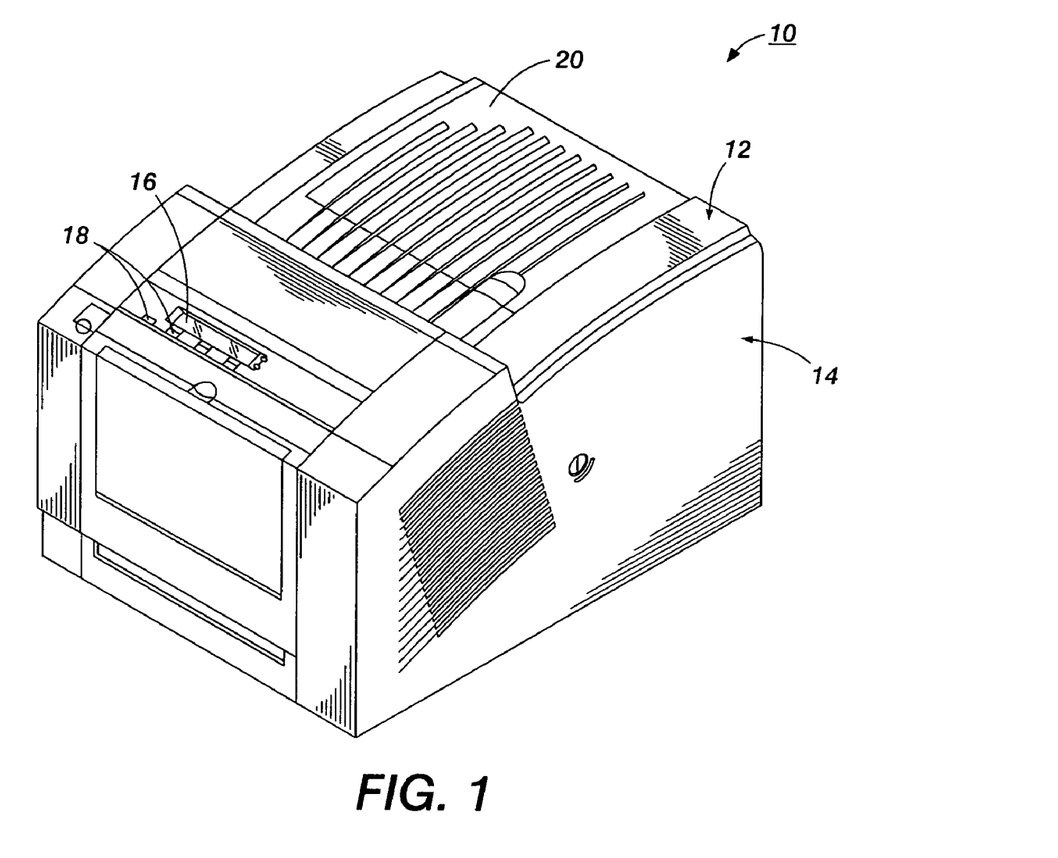
FIG. 1 is a perspective view of a solid ink printer that sets the power consumption level of the printer to one of a plurality of power consumption levels.

Referring to FIG. 1, there is shown a perspective view of an ink printer 10 that implements a solid ink offset print process. The reader should understand that the embodiment discussed herein may be implemented in many alternate forms and variations and is not limited to solid ink printers only. The system and process described below may be used in image generating devices that operate components at different temperatures and positions to conserve the consumption of energy by the image generating device. Additionally, the principles embodied in the exemplary system and method described herein may be used in devices that generate images directly onto media sheets. Also, any suitable size, shape or type of elements or materials may be used. The method and apparatus described herein for managing the power level of an image generating device may be used in any type of device that changes its mode of operation to conserve energy.

FIG. 1 shows a solid ink printer 10 that includes an outer housing having a top surface 12 and side surfaces 14. A user interface display, such as a front panel display screen 16, displays information concerning the status of the printer, and user instructions. Buttons 18 or other control actuators may be used to select or define parameters for controlling operation of the printer. The buttons may be located adjacent the user interface display 16 or they may be provided at other locations on the printer. Additionally or alternatively, buttons 18 may be implemented as radio buttons on the display 16. In such an embodiment, the user display 16 also incorporates a touch screen to provide input data to the printer controller.

An ink feed system delivers ink to an ink jet printing mechanism (not shown) that is contained inside the housing. The ink feed system may be accessed through the hinged ink access cover 20 that opens to reveal keyed openings and feed channels having an ink load linkage element. The ink access cover and the ink load linkage element may operate as described in U.S. Pat. No. 5,861,903 for an Ink Feed System, issued Jan. 19, 1999 to Crawford et al. In one embodiment, the ink jet printing mechanism ejects ink onto a rotating intermediate imaging member and the image is transferred to a sheet of media. In another embodiment, the ink jet printing mechanism ejects the ink directly onto a media sheet.

Figure 2:
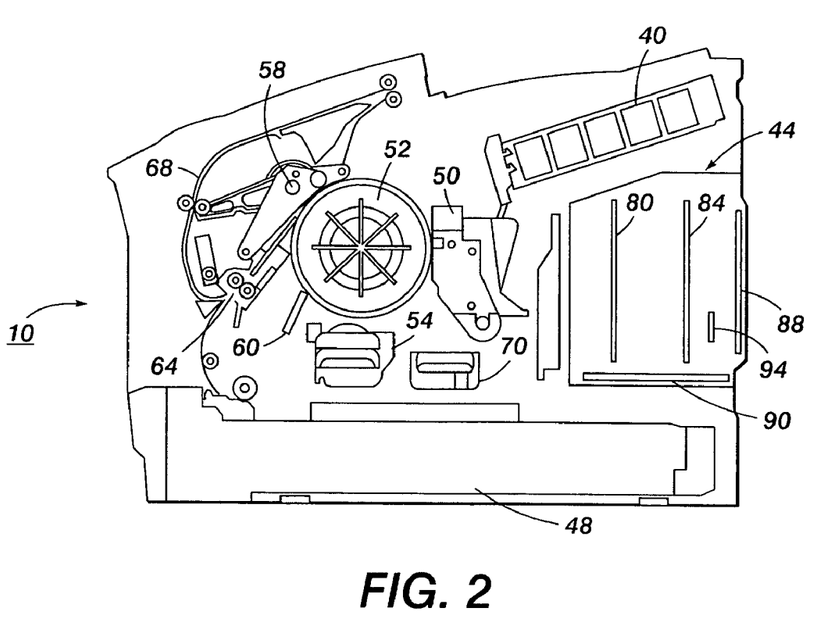
FIG. 2 is a side view of the printer shown in FIG. 1 that depicts the major subsystems of the solid ink printer.

As shown in FIG. 2, one embodiment of the ink printer 10 may include an ink loading subsystem 40, an electronics module 44, a paper/media tray 48, a print head 50, an intermediate imaging member 52, a drum maintenance subsystem 54, a transfer subsystem 58, a wiper subassembly 60, a paper/media preheater 64, a duplex print path 68, and an ink waste tray 70. In brief, solid ink sticks are loaded into ink loader 40 through which they travel to a melt plate located at the end of loader 40. At the melt plate, the ink stick is melted and the liquid ink is diverted to a reservoir in the print head 50. The ink is ejected by piezoelectric elements through apertures in plates to form an image on a liquid layer that is supported by the intermediate imaging member 52 as the member rotates. An intermediate imaging member heater is actuated by a controller to maintain the imaging member within an optimal temperature range for generating an ink image and transferring it to a sheet of recording media. A sheet of recording media is removed from the paper/media tray 48 and directed into the paper pre-heater 64 so the sheet of recording media is heated to a more optimal temperature for receiving the ink image. A synchronizer delivers the sheet of the recording media so its movement between the transfer roller in the transfer subsystem 58 and the intermediate image member 52 is coordinated for the transfer of the image from the imaging member to the sheet of recording media. As used herein, transfer system may also be understood as including a subsystem that fixes an image to an imaging member that received the ink image directly from a print head.

A duplex image includes a first image that is transferred from the intermediate imaging member onto a first side of a recording media sheet followed by a second image that is transferred from the intermediate imaging member onto the reverse side of the recording media sheet to which the first image was transferred. If a duplex image is to be transferred to the reverse side of a sheet, the reverse side of the sheet is presented to the intermediate imaging member by directing the sheet through the duplex print path 68 after it has passed through the transfer roller for the transfer of the first image. As the transfer process is repeated, the second image is transferred from the intermediate imaging member 52 to the reverse side of the sheet imaged during the previous transfer cycle. The sheet bearing the duplex image is then ejected by ejection rollers and deposited in the output tray.

The operations of the ink printer 10 are controlled by the electronics module 44. The electronics module 44 includes a power supply 80, a main board 84 with a controller, memory, and interface components (not shown), a hard drive 88, a power control board 90, and a configuration card 94. The power supply 80 generates various power levels for the various components and subsystems of the printer 10. The power control board 90 includes a power controller and supporting memory and I/O circuits to regulate power levels for the image generating device. The configuration card contains data in nonvolatile memory that defines the various operating parameters and configurations for the components and subsystems of the printer 10. The hard drive stores data used for operating the ink printer and software modules that may be loaded and executed in the memory on the main board 84.

The main board 84 includes a printer controller that operates the printer 10 in accordance with the operating program executing in the memory of the main board 84. The controller receives signals from the various components and subsystems of the printer 10 through interface components on the main board 84. The controller also generates control signals that are delivered to the components and subsystems through the interface components. These control signals, for example, drive the piezoelectric elements to expel ink through print head apertures to form the image on the imaging member 52 as the member rotates past the print head. As described in more detail below, the main board also includes a timer for counting time periods and generating a power level adjustment signal. The timer may also generate a time of day for system functions including the power level setting function.

Figure 3A:
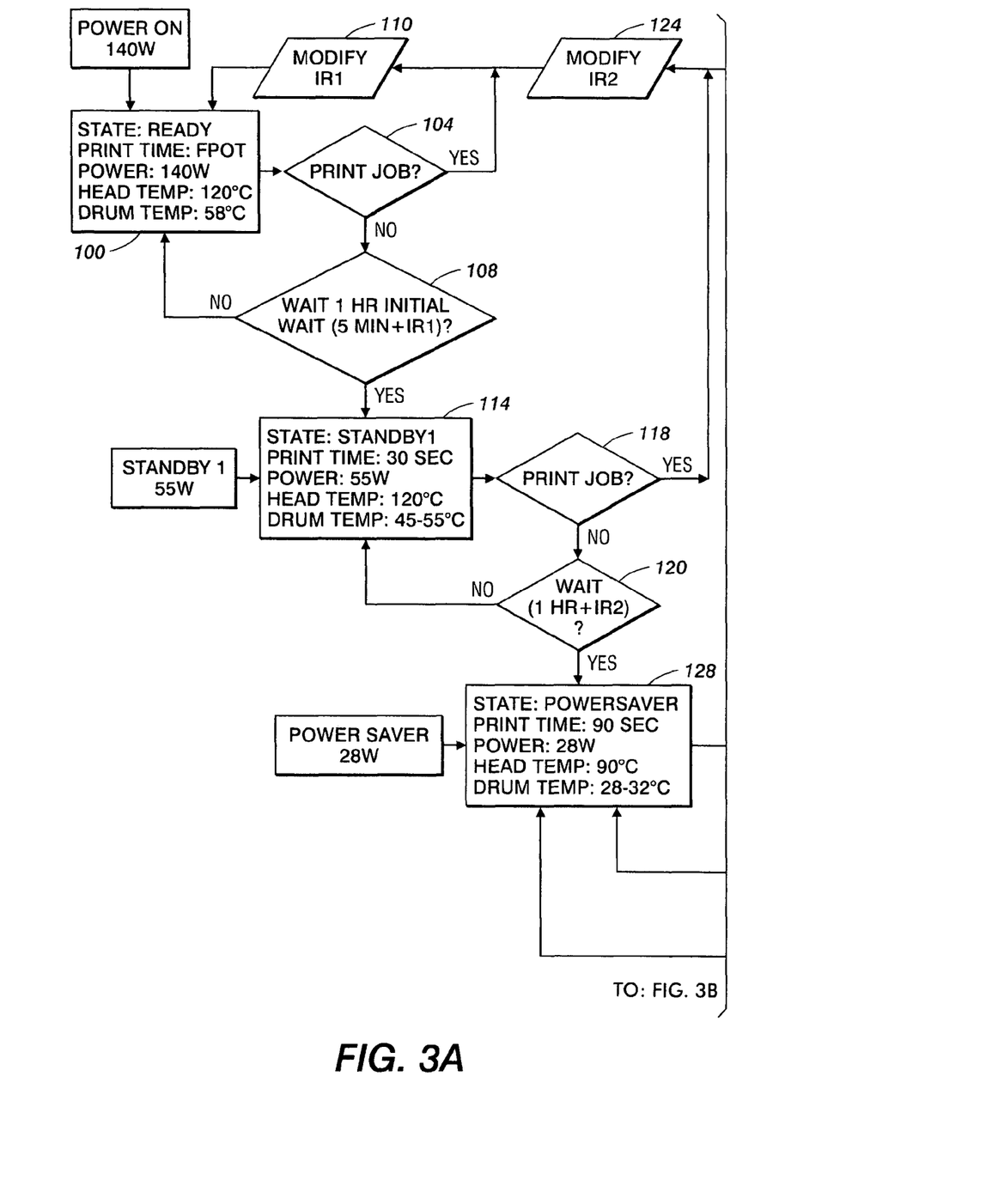
FIG. 3 is a flow diagram of a process for controlling the power modes of the printer shown in FIG. 2.
Figure 3B:
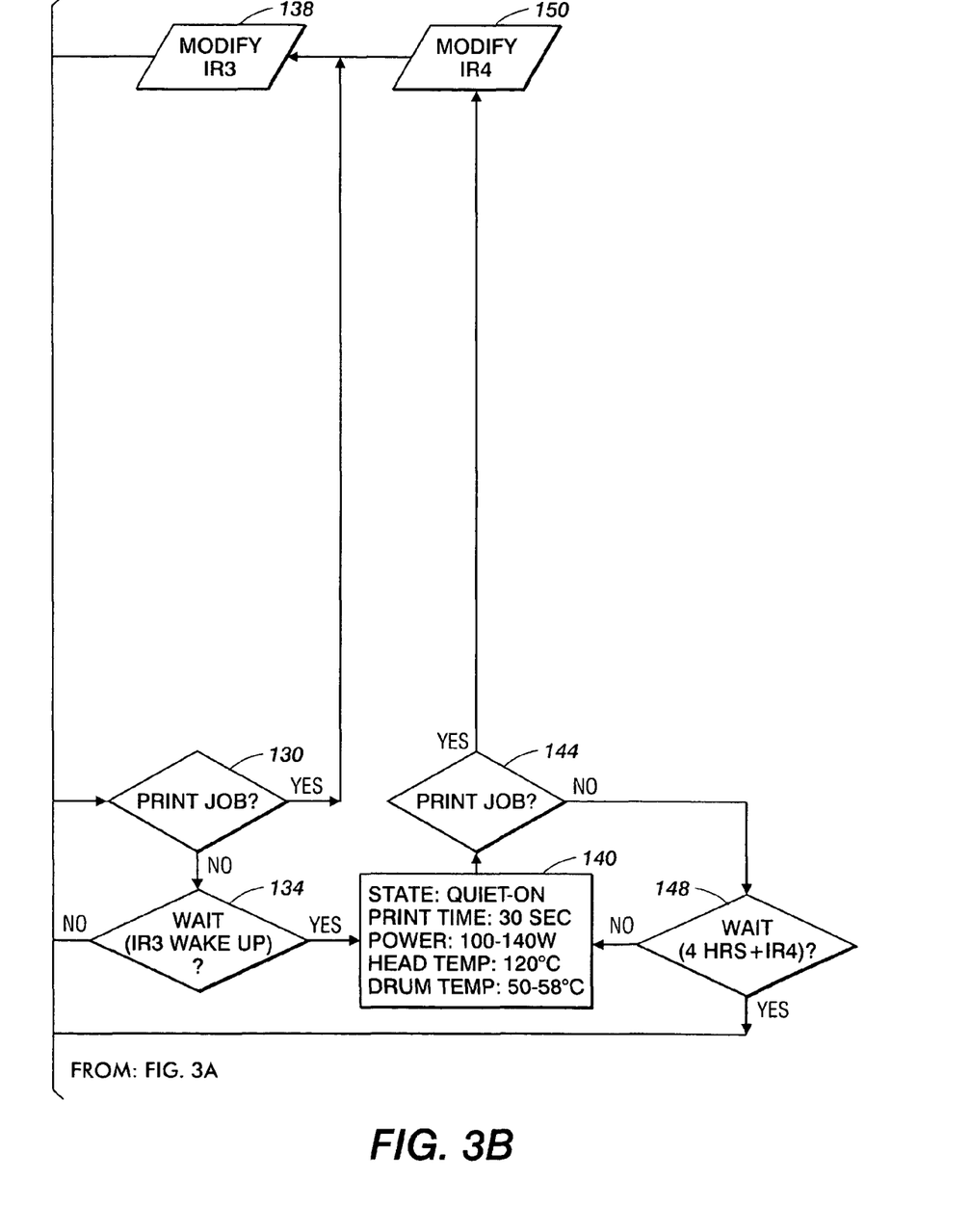

An exemplary process for controlling the power mode operation of an image generating device is shown in FIG. 3. The process may begin at device initialization. At initialization, the image generating device enters a fully operational power mode (block 100). In the fully operational mode, the image generating device brings all components to the operating temperature and position for generating an image. For example, in an ink jetting printer, the print head and imaging member are brought to the temperature and position for making liquid ink available at the print head for ejection onto the imaging member and the imaging member is made ready for receiving the ink. As used herein, the term imaging member includes intermediate imaging members that are used in offset image generating devices and direct imaging members that are used to receive colorant directly from a print head. Although the embodiment is described with reference to an ink jet print head, the term print head may be understood to include a toner development station or other known image generating component. The print head is also brought to an appropriate location for ejecting ink onto the imaging member. Other components that may be activated at initialization include the media pre-heater and/or a heated transfer drum, for example.

Upon entry into the initialization mode, the timer begins waiting for receipt of an image generating request (block 104) and commences timing a first wait time (block 108). A first wait time modifier IR1, which is used to define the first wait time, may be a single time period that is adjusted as discussed below or it may be a sum of multiple time periods. In one embodiment, the first wait time modifier is a sum of two time periods. The time period(s) comprising the first wait time modifier may be modified with reference to use of the image generating device. In FIG. 3, the first wait time modifier is a sum of two time periods, IR1$a$ and IR1$b$. The current use time component, IR1$a$, may correspond to a minimum power level adjustment period, such as a five minute period, plus an increment, which is adjustable in response to detected usage of the image generating device during the current time period. The historical use time component, IR1$b$, correlates to usage of the image generating device during one or more time periods that have occurred prior to the current time period. The process remains in the fully operational power mode (block 100) as it waits for an image generating request (block 104) or expiration of the first wait time (block 108). Upon expiration of the first wait time, the timer generates a power adjustment signal and the power controller responds by setting the power consumption level for the device to a low power mode (block 114).

If an image generating request is detected before the first wait time expires, the process modifies the adjustable component of the first wait time modifier to compensate for ongoing device usage (block 110). This time period modification helps ensure that the first wait time modifier keeps the image generating device in the fully operational power state, rather than the low power mode, when a reasonable probability exists that a job request will be received. This control action is desirable because the device in the fully operational mode responds more quickly to image job requests than the device does when it is in the low power mode.

In the embodiment being described, the device controller adjusts a current use time component of the first wait time modifier before resetting the timer with the first wait time modifier. To support adjustment of the current use time component, the device controller monitors device usage in quarter hour segments synchronized with the quadrants of a clock face to detect usage requiring first wait time modifier modification. To perform this detection, the device controller stores the number of print jobs processed by the device during a quarter hour segment. In response to receipt of a job request, the device controller retrieves the number of print jobs processed during the preceding quarter hour segment as well as the number of print jobs processed during the current quarter hour segment. If the number of jobs processed in the prior quarter hour is equal to or below a minimum threshold, then a negative time adjustment parameter is selected. Otherwise, no time adjustment parameter is selected. The device controller also retrieves the number of jobs processed in the current quarter hour segment. If the number of jobs processed in the current quarter hour is equal to or above a maximum threshold, then a positive time adjustment parameter is selected. Otherwise, no time adjustment parameter is selected. The two time adjustment parameters are added to the current use time component, IR1$a$, to modify the first wait time modifier to a new value. The new value is compared to a current use time component minimum and maximum to keep the current use time component from growing too large or below a minimum value, which may correspond to a value defined by or derived from a government standard, for example.

In the embodiment being discussed, if the number of jobs processed in the previous quarter hour is zero, then the time adjustment parameter is −10 minutes, if it is one job or more, then the time adjustment parameter is 0 minutes. In that same embodiment, if the number of jobs processed in the current quarter hour is two or greater, then the time adjustment parameter is 30 minutes; otherwise, the time adjustment parameter is 0 minutes. In that same embodiment, the current use time component maximum is sixty (60) minutes and the current use time component minimum is five (5) minutes. Of course, the description of this embodiment is for illustrative purposes and not intended to be limiting. Other time periods may monitored and used for adjusting first wait time modifiers, as well as other thresholds, time adjustment parameters, and limitations for the first wait time modifiers.

Use of the number of jobs processed in the previous and current quarter hour segments for adjustment of the first wait time modifier helps keep the image generating device in the fully operational power level for the generation of images in response to a user sending job requests within the first wait time. The first wait time, however, steadily decreases during the relatively low use hours. Consequently, the first wait time would be relatively small, if not at the minimum, during any period of relatively little or no use. The first wait time modifier also includes a historical use time period, IR1$b$. This historical use time period is adjusted on a periodic basis to account for regular usage of the device during particular periods of a day. In the embodiment being discussed, the historical use time period may be adjusted at the end of a day measured from midnight to midnight, although other periodic periods and adjustment times may be used.

In the embodiment being discussed, the device controller sums the number of jobs processed for each quarter hour segment for each hour of the day that was last completed. The number of jobs performed during each hour of the day is summed. Once the number of jobs has been established for each hour of a day, the device controller computes a time adjustment parameter for the hour. In the embodiment being discussed, a past, a present, and a future demand are calculated from the number of jobs processed for an hour preceding a particular hour, the particular hour, and the following hour, respectively. For example, the number of jobs for each of these hours may be multiplied by a historical time adjustment factor. The resulting values may be summed to generate a historical use time period or the largest one may be selected. Other combinations of weighting the contributions of adjacent hours or other time segments may be used. For example, if the number of jobs for 7 a.m. is 0, 8 a.m. is 1, 9 a.m. is 2, and the historical time adjustment factor is 1 hour, then the historical use time period may be calculated as (0 jobs×1 hour)+(1 job×1 hour)+(2 jobs×1 hour)=3 hours. Thus, the historical use time period for 8 a.m. would be 3 hours. The historical use time period may also be subject to a minimum and a maximum threshold. In the embodiment being discussed, the minimum historical use time period is 0 minutes and the maximum historical use time period is 2 hours. Thus, in the example, the historical use time period for 8 a.m. would be limited to 2 hours, instead of the calculated 3 hours.

In light of the above discussion, one can appreciate the flexibility in the readiness state of an image generating device provided by this process. The historical use time component (IR1$b$) enables the device to maintain a state of readiness for generating images based on the usage of the device at particular periods of time during a day. This component of the first wait time modifier is likely to dominate the first wait time for typical working hours during a work week. On the other hand, the historical use time period is likely to be small or zero for non-working hours. Should a user initiate use during such a time, however, the current use time component (IR1$a$) increases quickly to maintain the device in a state of readiness during the time that the user continues to use the device. Thus, an image generating device that uses the process described above to control the transition from the fully operational power level to the low power level is likely to respond more quickly to a user and return to the lower power consumption rate more quickly than devices that rely upon predefined time periods for power level transitions. Thus, this process is designed to minimize power consumption, yet maximize a positive customer experience.

With continued reference to FIG. 3, following modification of the current use time component, IR1a, (block 110), the image generating device performs the image generation and resets the timer to the first wait time modifier. The process then returns to waiting for another image generating request (block 104) or expiration of the first wait time (block 108). As already noted, modification of the historical use time component may occur periodically at a pre-selected time.

In response to expiration of the first wait time (block 108), the timer generates a power adjustment signal and the power controller responds by reducing the power level for the image generating device to a low power mode (block 114). In this mode, for example, the print head is left in the position to eject ink, and the temperature of the print head and the imaging member are reduced. For example, in one embodiment, the temperature of the imaging member is reduced from about 55° C. to a temperature in the range of about 40° C. to about 50° C. and the print head is reduced in temperature by about 10 to 20° C. Also, for example, the electronics are disabled except for the components required for monitoring for receipt of image generating requests. Additionally, the media preheater may have its temperature reduced as well.

Upon entry into the low power mode, the timer is initialized to count a second wait time modifier. The timer then begins waiting for receipt of an image generating request (block 118) and timing the second wait time (block 120). The second wait time modifier may be a single time period that is adjusted as discussed below or it may be a time period that is a sum of time components. In FIG. 3, the second wait time modifier is the sum of two time components. The process remains in the low power mode (block 114) as it waits for an image generating request (block 118) or expiration of the second wait time (block 120).

If an image generating request is detected before the second wait time expires, the process modifies the adjustable component of the second wait time modifier to compensate for device usage that occurred during a prior time period (block 124) and then performs the first wait time modifier modification described above (block 110). The second wait time modifier modification helps ensure that the second wait time keeps the image generating device in the low power state, rather than the sleep mode, when a reasonable probability exists that a job request will be received. This control action is desirable because the device in the low power mode responds more quickly to image job requests than the device does when it is in the sleep mode.

In the embodiment being described, the device controller modifies the second wait time modifier (IR2) in a manner similar to that described above with respect to the first wait time modifier (IR1). For one implementation of this time period adjustment, the device controller retrieves the quarter hour device usage measurements for the current quarter hour and the preceding quarter hour. If the number of jobs processed in the prior quarter hour is equal to or below a minimum threshold, then a negative time adjustment parameter is selected. Otherwise, no time adjustment parameter is selected. The device controller also retrieves the number of jobs processed in the current quarter hour segment. If the number of jobs processed in the current quarter hour is equal to or above a maximum threshold, then a positive time adjustment parameter is selected. Otherwise, no time adjustment parameter is selected. The two time adjustment parameters are added to the current use time component, IR2a, to modify the second wait time modifier to a new value. The new value is compared to a current use time component minimum and maximum to keep the periodic use time component from growing too large or below a minimum, which may correspond to a value defined by or derived from a government standard, for example.

In the embodiment being described, if the number of jobs processed in the previous quarter hour is zero, then the time adjustment parameter is −10 minutes, if it is one job or more, then the time adjustment parameter is 0 minutes. In that same embodiment, if the number of jobs process in current quarter hour is two or greater, then the time adjustment parameter is 30 minutes, otherwise, the time adjustment parameter is 0 minutes. In that same embodiment, the maximum current use time component is one hundred and twenty (120) minutes and the minimum current use time component is sixty (60) minutes. Of course, the description of this embodiment is for illustrative purposes and not intended to be limiting. Other time periods may monitored and used for adjusting periodic use time periods, as well as other thresholds, time adjustment parameters, and limitations for the periodic use time periods.

Use of the number of jobs processed in the previous and current quarter hour segments for adjustment of the second wait time modifier helps keep the image generating device at the low power level to facilitate a transition to the fully operational power level for the generation of images in response to a user sending job requests within the second wait time. The second wait time modifier, however, steadily decreases towards its minimum value during the relatively low use hours, such as evening, early morning, weekend, or holiday hours. Consequently, the second wait time modifier would be relatively small, if not at the minimum, upon the return of the users in the morning. To compensate for this effect of such typical low usage periods on the second wait time modifier, the second wait time modifier also includes a historical use time period, IR2b. This historical use time period is adjusted on a periodic basis to account for regular usage of the device during particular periods of a day.

In the embodiment being described, the historical use time period may be adjusted at the end of a day measured from midnight to midnight, although other periodic periods and adjustment times may be used. The device controller may sum the number of jobs processed for each quarter hour segment for each hour of the day that was last completed. The number of jobs performed during each hour of the day is summed. Once the number of jobs has been established for each hour of a day, the device controller computes a time adjustment parameter for the hour. In the embodiment being discussed, a past, a present, and a future demand are calculated from the number of jobs processed for an hour preceding a particular hour, the particular hour, and the following hour, respectively. This calculation may be performed in a manner similar to the calculation described above with respect to the historical use time component of the first wait time modifier, although other weighting combinations for the contributions of the adjacent hours or other time segments may be used. As noted above, the historical use time period may also be subject to a minimum and a maximum threshold. In the embodiment being discussed, the minimum historical use time period is 0 minutes and the maximum historical use time period is 4 hours.

In light of the above discussion, one can appreciate the flexibility in the readiness state of an image generating device provided by the adjustment of the second wait time modifier. The historical use time period enables the device to maintain the low power level for a quicker transition to the fully operational power level to generate images based on the usage of the device at particular periods of time during a day. Thus, an image generating device that uses the process described above to control the transition from the low power level to the sleep power level is likely to respond more quickly to a user and return to the sleep power consumption level more quickly than devices that rely upon predefined time periods for power level transitions.

Following modification of the second wait time modifier (block 124) and the first wait time modifier (block 110), the image generating device reenters the fully operational power mode (block 100), performs the image generation, and resets the timer to the first wait time modifier. The image generating device remains in the fully operational mode and returns to waiting for another image generating request (block 104) or expiration of the first wait time (block 108).

In response to expiration of the second wait time (block 120), the timer generates a power adjustment signal and the power controller responds by reducing the power level for the image generating device to a sleep power level (block 128). In this mode, for example, the print head may be moved away from the intermediate drum and the temperature of the print head reduced to a nominal value that maintains the ink in the print head as a liquid. For example, in one embodiment, the print head is maintained at a temperature of about 95° C. The heater of the intermediate drum is turned off to further conserve energy. The electronics remain disabled except for the minimum components required for monitoring for image generating requests. Additionally, the heaters for the media pre-heater and transfer roller are turned off as well.

Upon entry into the sleep mode, the timer is configured to detect an activation day and time. The timer then begins waiting for receipt of an image generating request (block 130) and monitoring for the activation day and time (block 134). The activation time may be a day and time of day that is established by collecting and statistically analyzing usage parameters. A process for calculating the activation time is described in U.S. Pat. No. 6,243,548, which is commonly owned by the owner of this application and is hereby expressly incorporated in its entirety by reference. In FIG. 3, the activation time is denoted IR3. The timer may be configured to initialize a comparator with the activation time. The comparator, thereafter, compares the time of day with the activation time to determine whether the activation time has been reached. The process remains at the sleep power level (block 128) as it waits for an image generating request (block 130) or detection of the activation time (block 134).

In response to an image generating request being received, the process calculates an activation time for the sleep power level (block 138), and modifies the second wait time modifier for the low power level (block 124) as well as the first wait time modifier for the fully operational power level (block 110). Modification of the activation time and the adjustable time components helps ensure that the device is not likely to enter the sleep power consumption level when a reasonable probability exists that an job request will be received. Following modification of the activation time, IR3, and the adjustable time components, IR1 and IR2 (blocks 138, 124, and 110), the image generating device enters the fully operational power mode (block 100), performs the image generation and resets the timer to the first wait time modifier. The process then returns to waiting for another image generating request (block 104) or expiration of the first wait time (block 108).

In response to detection of the activation time without user interaction or receipt of a print job (block 134), the timer generates a power adjustment signal and the power controller responds by setting the power level for the image generating device to a nominal operating power mode (block 140). In this mode, for example, components may be brought to operating temperatures, but mechanical actuators are not activated to move components. This mode of operation may be described as a "quiet" mode as the mechanical actuators generate noise as they move components within the image generating device. For example, in one embodiment, the print head is brought to its operating temperature of 120° C., but it is left in the position it obtained upon entry into the sleep power level. Likewise, the temperature of the intermediate drum, in one embodiment, for example, is returned to its operating temperature in the range of about 55° C. to about 58° C. Again, no movement of the intermediate drum is performed. Other components may be brought to or near their operating temperatures so the device requires little time for mechanical readiness to perform image generation.

Upon entry into the nominal operating power mode, the timer begins waiting for receipt of an image generating request (block 144) and timing an anticipation period (block 148). The anticipation period may be a constant time period or it may be an adjustable time period. In the embodiment being described, the anticipation period, IR4, is a constant time period of four (4) hours. The anticipation period, however, may adjustable by a process similar to that described above with respect to the first wait time modifier and the periodic use time period. The adjustable time component in such an embodiment may be from zero to some time period up to a maximum threshold. The process shown in FIG. 3 remains in the nominal operational power mode (block 140) as it waits for an image generating request (block 144) or expiration of the anticipation time period (block 148).

In response to an image generating request being received, the process may modify or reset the anticipation time period (block 150), the activation time (block 138), the second wait time modifier (block 124), and the first wait time modifier (block 110). In the process shown in FIG. 3, the anticipation time period, IR4, remains a constant and is used to reset the timer upon the power controller setting the power level to the nominal operating power level. Following modification of the anticipation time period (block 150), as well as the other delay period and activation time modifications, the image generating device enters the fully operational power mode, performs the image generation and resets the timer to the first wait time modifier (block 100). The process then returns to waiting for another image generating request (block 104) or expiration of the first wait time (block 108).

In response to expiration of the anticipation time period (block 148), the timer generates a power adjustment signal and the power controller responds by reducing the power level for the image generating device to the sleep power level (block 128). Exemplary energy conservation action taken in this mode is described above with reference to entry of this power level from the low power level.

Figure 4:
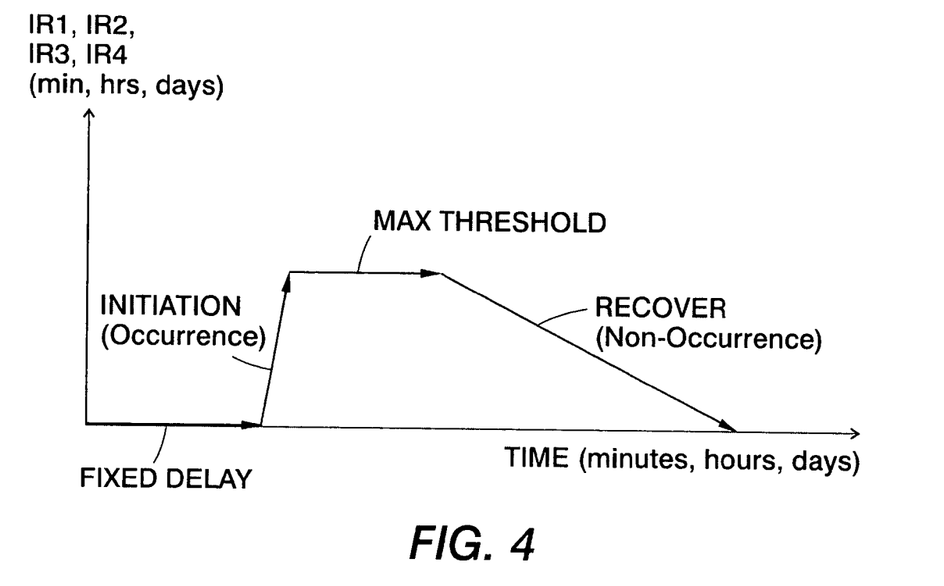
FIG. 4 is a diagram depicting one scheme for modifying the delay periods used for controlling the power modes of the printer shown in FIG. 2.

The trend for the adjustments of the time period is depicted graphically in FIG. 4. As shown in FIG. 4, following the first initialization of the device, the rate of adjustment for the increments increases substantially from zero to a maximum threshold. That is, the increments are increased at a certain rate, which is shown as being a relatively large amount in response to receipt of an image generating request during timing of a time period to help ensure that the device remains available or is quickly made ready for performing an image generating job. The maximum threshold is the time period beyond which no further adjustments are allowed. As shown in FIG. 4, the rate of adjustment for the time periods IR1, IR2, or IR4 may also decrease at a second rate in response to reduced or no use. Again, the goal is to keep the time increments at values that present a low risk that a lengthy preparation period occurs in response to an image generating request. These decreases may continue until the increment has reached zero and the default periods are used without a delay increment for control of the power modes, i.e., the printer reduces the delay time periods to the default values that were programmed into the printer at the time it was shipped. These default times are independent of the measured customer usage patterns.

Those skilled in the art will recognize that numerous modifications can be made to the specific implementations described above. For example, while the embodiments above have been described with reference to a solid ink offset printer, the system and method may be used to adjust the duration of a plurality of power consumption modes in other types of printers, other types of image generating devices, or other devices that vary their power consumption levels. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

We claim:

1. A process for controlling power consumption levels in a device comprising:
   operating a device at a fully operational power level;
   counting a first wait time;
   modifying a first wait time modifier in response to detection of device use prior to expiration of the first wait time; and
   reducing power consumption from the fully operational level to a low power level in response to expiration of the first wait time.

2. The process of claim 1 further comprising:
   modifying the first wait time modifier in response to detection of device use during a time period that occurred prior to commencement of the counting of the first wait time.

3. The process of claim 2 further comprising:
   storing usage data corresponding to device usage occurring during a time period prior to a first wait time being counted by the timer; and
   modifying the first wait time modifier in accordance with the stored usage data.

4. The process of claim 3 further comprising:
   commencing counting of a second wait time upon expiration of the first wait time; and
   reducing power consumption from the low power level to a sleep level in response to expiration of the second wait time.

5. The process of claim 3 further comprising:
   modifying a second wait time modifier in response to detection of device usage during a previous time period.

6. The process of claim 5 further comprising:
   commencing counting of a nominal operating power time period in response to the power consumption level being set to a nominal operating power level that is less than the fully operational power level; and
   reducing power consumption from the nominal operating power level to the sleep power level in response to expiration of the nominal operating power time period.

7. The process of claim 2, the first wait time modifier modification further comprising:
   measuring device usage during time slots on multiple days of device usage; and
   modifying the first wait time modifier in correspondence with the device usage measurement.

8. A system for adjusting power consumption levels in a device comprising:
   a timer for generating a power level adjustment signal in response to expiration of a time period being counted by the timer;
   a timer modifier for modifying the time period being counted by the timer;
   a device controller for controlling operation of a device, the device controller modifying the timer modifier in response to the device controller detecting usage of the device; and
   a power controller for selectively setting the device at one of a plurality of power consumption levels in response to the power level adjustment signal.

9. The system of claim 8 wherein the power controller sets the power consumption level for the device at one of four power consumption levels.

10. The system of claim 9 further comprising:
    the device controller for storing usage data corresponding to image generating device usage occurring during a time period prior to a first wait time being counted by the timer; and
    the device controller modifies a first wait time modifier in accordance with the stored usage data.

11. The system of claim 10 wherein the power controller sets the power consumption level at a low power level in response to the timer generating a power level adjustment signal upon expiration of the first wait time.

12. The system of claim 11 further comprising:
    the timer counting a second wait time in response to the power controller setting the power level of the image generating device to the low power level; and
    the device controller modifying a second wait time modifier in accordance with the stored usage data.

13. The system of claim 12 further comprising:
    the power controller setting the power consumption level of the image generating device to a sleep power level in response to the power adjustment signal generated by the timer upon expiration of the second wait time.

14. An ink jetting printer comprising:
    an ink reservoir for storing liquid ink;
    a print head for receiving the liquid ink from the ink reservoir;
    an imaging member for receiving liquid ink ejected from the print head to form an ink image on the imaging member;
    a transfer subsystem for fixing the ink image, the transfer subsystem including at least one heated roller; and
    an electronics module for controlling operation of the ink jetting printer, the electronics module further comprising:
       a timer for counting time periods and generating a power adjustment signal upon expiration of a time period counted by the timer;
       a timer modifier for modifying the time period being counted by the timer;
       a printer controller for generating control signals for operation of the printer and for modifying the timer modifier in accordance with usage of the printer; and a power controller for setting a power consumption level to one of a plurality of power consumption levels for the printer in response to receipt of one of a power adjustment signal and an imaging generating request.

15. The ink jetting printer of claim 14 further comprising:

the printer controller storing usage data corresponding to image generating device usage occurring during a time period prior to a first wait time being counted by the timer and modifying a first wait time modifier in accordance with the stored usage data;

the timer generates the power adjustment signal upon expiration of the first wait time.

16. The ink jetting printer of claim 15 further comprising:

the power controller setting the power consumption level to a low power level in response to the power adjustment signal generated upon expiration of the first wait time; and the printer controller generating control signals to reduce imaging member temperature and transfer system heated roller temperature in response to the power consumption level being set to the low power level.

17. The ink jetting printer of claim 16 further comprising:

the timer commencing timing of a second wait time in response to the power consumption level being set to the low power level;

the printer controller modifying the second wait time in accordance with the stored usage data.

18. The ink jetting printer of claim 17 further comprising:

the power controller setting the power consumption level to a sleep power level in response to the timer generating a power adjustment signal upon the expiration of the second wait time; and the printer controller generates control signals to reduce print head temperature and imaging member temperature in response to the power consumption level being set to the sleep power level.

19. The ink jetting printer of claim 18 further comprising:

the timer commencing timing of a sleep time in response to the power consumption level being set to the sleep power level;

the power controller setting the power consumption level to a nominal operating power level that is less than a fully operational power level for the printer in response to the power adjustment signal generated by the timer upon expiration of the sleep time period.

20. The ink jetting printer of claim 19 further comprising:

the timer commencing timing of a quiet time in response to the power consumption level being set to the nominal operating power level; and the power controller setting the power consumption level to the sleep power level in response to the power adjustment signal being generated by the timer upon expiration of the quiet time.

* * * * *